(12) United States Patent
Pun et al.

(10) Patent No.: US 7,256,769 B2
(45) Date of Patent: Aug. 14, 2007

(54) SYSTEM AND METHOD FOR TEXT ENTRY ON A REDUCED KEYBOARD

(75) Inventors: Samuel Yin Lun Pun, Calgary (CA); John M. Conrad, Calgary (CA); Eun-Kyong Paek, Seoul (KR); Changshi Xu, Calgary (CA)

(73) Assignee: Zi Corporation of Canada, Inc., Calgary (CA)

( * ) Notice: Subject to any disclaimer, the term of this patent is extended or adjusted under 35 U.S.C. 154(b) by 308 days.

(21) Appl. No.: 10/373,280

(22) Filed: Feb. 24, 2003

(65) Prior Publication Data

US 2004/0164951 A1    Aug. 26, 2004

(51) Int. Cl.
G09G 5/08    (2006.01)
G09G 5/00    (2006.01)

(52) U.S. Cl. .......................... 345/171; 341/22; 341/26; 341/122; 345/156; 400/109; 400/477; 700/14; 700/17; 700/84; 455/566

(58) Field of Classification Search ................ 345/156, 345/168, 169, 171–173, 2.3, 467; 700/14, 700/17, 84; 341/22, 26, 182; 455/566; 400/109, 400/477; 285/466, 145 R
See application file for complete search history.

(56) References Cited

U.S. PATENT DOCUMENTS

| 5,109,352 | A   |    | 4/1992  | O'Dell |           |
|-----------|-----|----|---------|--------|-----------|
| 5,586,198 | A   |    | 12/1996 | Lakritz |          |
| 5,797,098 | A   | *  | 8/1998  | Schroeder et al. | 455/464 |
| 5,926,566 | A   |    | 7/1999  | Wang et al. |      |
| 6,686,902 | B2  | *  | 2/2004  | Lee    | 345/157   |
| 6,741,235 | B1  | *  | 5/2004  | Goren  | 345/173   |
| 6,744,423 | B2  | *  | 6/2004  | Kraft et al. | 345/169 |
| 6,822,585 | B1  | *  | 11/2004 | Ni et al. | 341/28 |
| 6,847,311 | B2  | *  | 1/2005  | Li     | 341/28    |

OTHER PUBLICATIONS

"Predictive Keyboard Optimized For Multiple Text Types" IBM Technical Disclosure Bulletin, US, IBM Corp. New York, vol. 38, No. 6, Jun. 1, 1995, pp. 371-372.

Darragh J. J. et al.: "The Reactive Keyboard: A Predictive Typing Aid" Computer, US, IEEE Computer Society, Long Beach, CA. vol. 23, No. 11, Nov. 1, 1990, pp. 41-49.

Masui T: "An Effective Text Input Method For Pen-Based Computers" CHI Conference Proceedings, Human Factors In Computing Systems, US, New York, NY: ACM, 1998, pp. 328-335.

International Application Published Under the Patent Cooperation Treaty, Int'l Application No.: PCT/US00/00135, Int'l Filing Date: Jan. 4, 2000, by O'Dell for a Text Input System for Ideographic and Nonideographic Languages, all pages.

* cited by examiner

Primary Examiner—Henry N Tran
(74) Attorney, Agent, or Firm—Cesari & McKenna, LLP

(57) ABSTRACT

A system and method for efficient Asian character text input into a reduced keypad machine such as a word processor, telephone, hand-held computer, or personal computer is provided. The system comprises a data entry keypad associated with a monitor, and a disambiguation process supporting multiple keycap depression timespan range definitions and interpretations to produce accurate messaging with a reduced keypad.

24 Claims, 12 Drawing Sheets

500 a ㅏ *a* as in father

ㅓ *aw* as in thaw, *uh* as in uh-oh

501 o ㅗ *o* as in poke (push your lips out!)          M u ㅜ *oo* as in boot (push your lips out!)

502

æ ㅐ *a* as in bat          D e ㅔ *e* as in bet

ɨ ㅡ *u* as in pull (don't push your lips out!)

The vowel ㅡ is pronounced with your tongue in the position for ㅜ *u*, but with no lip-rounding (smile!)

i ㅣ *ee* as in feet we ㅟ *we* as in wet

The vowel ㅟ is therefore pronounced exactly the same as ㅔ by most Seoul speakers. (Pursed lips at the start only.)

wi ㅟ French *oui*

ɨy ㅢ *u* as in pull followed by *ee* as in feet ya ㅑ *ya* as in yard yo ㅕ *yo* as in yonder yo ㅛ *yo* as in yoga (push your lips out!)

yu ㅠ *yu* as in yuletide (push your lips out!)

yæ ㅒ *ya* as in yap or Yankee ye ㅖ *ye* as in yep

Finally, the following combinations give *w* plus VOWEL.

wa ㅘ the first vowel sound of wide or wow wo ㅝ *wo* of wonder wæ ㅙ *wa* of wax we ㅞ *we* of wet (that is, it has the same pronunciation as ㅟ above)

| | | | |
|---|---|---|---|
| o | ㅇ | *ng* as in singer | |
| 512 ⬎ p | ㅂ | *p* as in park, but relaxed | C |
| pʰ | ㅍ | *p* as in pow! with lots of aspiration (air) | |
| 514 ⬎ pp | ㅃ | *p* as in spa, tense, tight, no aspiration | DC |
| t | ㄷ | *t* as in tall, but relaxed | |
| tʰ | ㅌ | *t* as in talk! with lots of aspiration | |
| tt | ㄸ | *t* as in star, tense, tight, no aspiration | |
| k | ㄱ | *k* as in kiss, but relaxed | |
| kʰ | ㅋ | *k* as in kill! with lots of aspiration | |
| kk | ㄲ | *k* as in skill, tense, tight, no aspiration | |
| č | ㅈ | *ch* as in chill, but relaxed | |
| čʰ | ㅊ | *ch* as in change! with lots of aspiration | |
| čč | ㅉ | *tch* as in matchmaker, tense, tight, no aspiration | |
| m | ㅁ | *m* as in mother | |
| n | ㄴ | *n* as in no | |
| l | ㄹ | *l* as in lamp or *r* as in Spanish | |
| s | ㅅ | *s* as in soul, relaxed | |
| ss | ㅆ | *s* as in soul, tense | |
| h | ㅎ | *h* as in hope | |

FIG. 1C

SYSTEM AND METHOD FOR TEXT ENTRY ON A REDUCED KEYBOARD

BACKGROUND OF THE INVENTION

1. Field of the Invention

This invention relates to the field of efficient character entry into electronic devices, and more specifically to an efficient keypad entry system and method for Asian languages.

2. Background Information

The use of reduced keypads, such as those found on mobile telephones, is manageable for entering text in the Roman alphabet because there are only 26 letters and various control characters to distribute over 8 keys, generally 3-4 letters per key. Korean, Chinese, Japanese, and Vietnamese languages, by contrast, contain many characters and it is thus difficult to present all or even a meaningful subset of the languages' elements on a reduced keypad.

The modern versions of these Asian languages are written using Jamo/Hangul (Korean), Hanzi (Chinese), Kanji, Hiragana, Hatakana (Japanese), and Latin based characters with additions and tone markings (Vietnamese); each language also uses Latin characters. Text entry of these languages generally involves (1) keypad entry that is interpreted by an input method and a dictionary, and (2) interactive display and selection of candidates from a list presented as a result of the keypad entry.

Hangul, meaning Korean script, refers to the characters used to express contemporary written Korean. Hangul also refers to the scientifically designed Korean writing system, the Korean alphabet. Korean words are written in Hangul symbol blocks, rather than by arranging letters left to right in a row as in the use of a Western alphabet, but Hangul characters can be easily decomposed into Hangul elements, unlike the syllabic writing systems of Japan and China. Hangul elements represent individual sounds, but do not commonly carry any meaning. FIGS. 1A and 1B list Korean Hangul elements, known as "jamo", (meaning alphabet, sometimes referred to as "jaso") which include ten monothong vowel signs 501, eleven diphthong vowel signs 502, and nineteen consonant signs—fourteen consonants 512 and five double consonants 514.

There are six ways to combine jamo to form Hangul characters, which are usually composed of two or three jamo (some jamo are considered compound). A complete Hangul character (a pre-combined Hangul) includes up to four jamo. Written jamo are combined into syllable blocks, each block being similar in appearance to a Chinese character. A written syllable is composed of three positions, i.e., initial, medial, and final, to be written in that order. The initial position, coseong, is usually a consonant, and includes 19 different possible jamo, including the Zero consonant. The medial position, jungseong, is usually a vowel or diphthong letter, and includes 21 different possible jamo. The final position, jongseong, including 28 (counting the placeholder) different possible jamo, is usually either one or two consonant letters, or left empty. Korean Hangul uses spaces to separate words, unlike Chinese and Japanese.

Hanzi, Chinese characters also known as ideographs, pictographs, or logographs, represent meanings. Hanzi appear in other Asian languages (called hanja in Korean, kanji in Japan, and chú Hán in Vietnamese) and often have the same meaning in all languages. Hanzi are composed of radicals, of which there are 214, and other non-radical elements, and radicals are composed of strokes. Hanzi are combined to form compounds.

The Japanese Hiragana and katakana, collectively known as kana, represent the same 108 sounds but are drawn differently from each other. Kana are used along with kanji and Latin characters in the same Japanese language sentence. They cannot be decomposed in an alphabetic way, i.e. into vowels and consonants. Hiragana characters are typically used for writing grammatical words. Katakana characters are commonly used for writing words borrowed from other languages.

Each of these languages is represented by at least one character set standard, usually formulated and proliferated by a governmental organization. For example, KS X 1001: 1992, formulated in South Korea, is a basic Korean character set standard that enumerates 8,224 characters, 4,888 of which are hanja, 4620 unique hanja, and 2,350 pre-combined Hangul. The standard specifies 19 character classes, including jamo, Hangul, Roman, Greek, Latin, Cyrillic, and other symbols.

As another example, GB 13000.1, China's new national character standard, comprises 20,902 characters, and represents an effort to create a common writing method for information and communication products. GB 13000.1 code defines how the Chinese language is taught in schools and is commonly written. To date, the GB 13000.1 is China's largest effort to define a stroke writing order for the Chinese language. The standard builds upon the previous GB 2312-80 code of simplified Chinese characters by adding traditional characters as well as Chinese characters used in Korean and Japanese.

Within these standards are character-encoding standards that enable electronic processing of Asian characters. For each character set, there are possibly several encoding systems, each basically providing a mapping between each character in a particular character set, e.g. the set specified by KS X 1001:1992, and a numeric representation mapped to that character. Encoding systems arose in response to particular problems, and were optimized accordingly. ISO 2022, Extended Unix Code for Korea (EUC-KR), Johab (meaning "combining"), and Unified Hangul Code (UHC) encode the KS X 1001:1992 character set. UHC and Johab are both forward compatible with Unicode, the international 16-bit character set developed by the Unicode Consortium. Thus there are mappings between Johab, for example, and Unicode, the encoding used in an illustrative embodiment of this invention.

The Johab encoding system, as an example of a particular implementation of encoding a character set, contains 11,172 combinations which represent all the possible pre-combined Hangul. This encoding is described in Annex 3 of the KS X 1001:1992 standard. Only a fraction of these combinations represents real words, similar to encoding all possible three-letter words in English. The 2350 pre-combined forms, known as the "standard plane", are a subset of all possible permutations. Johab encoding specifies a combination of up to 3 jamo, each using 5 bits, concatenated together, for a 15-bit combination. The $16^{th}$ bit in the 2-byte word is reserved. The Unicode encoding standard maps these 16-bit combinations to other bit patterns.

Encoding systems enable electronic entry of language elements into a reduced keypad. As in English language data entry into such a reduced-size keypad, a disambiguation system is required. Further, efficient entry into a reduced-size keypad also requires intelligent placement of character elements on keys of the keypad in addition to user-friendly methods for candidate selection and word delimiting. For example, since Korean jamo are used commonly to make a limited number of syllables relative to the total possible combinations, as described above, and the frequency of the ordinary use of these syllables in particular positions in a word can be known, it is possible to employ for text entry a keypad that has fewer keys than the total possible number of jamo.

One possible electronic data disambiguation method for Asian languages allows for varying keypress timeframes that are used to differentiate between, for example in the Korean language, consonants and double consonants, or monothongs and diphthongs. By this method, the number of possible jamo from which the user could choose to construct a symbol is increased, but the necessity of a "soft key" (a control key used for delimiting and candidate selection) simultaneously limits the number of keys available for jamo placement.

It is an object of the invention to provide a system in which data entry keypress combines jamo selection, word building, and symbol selection that increases efficiency in the use of keypads for Korean text entry.

SUMMARY OF THE INVENTION

In brief summary, the present invention provides an improved system and method for Asian language text input using a reduced size keypad through variable keypress timespan ranges. More specifically, the present invention provides a keypad-type device that can accept variable keypress timespan ranges and a process that provides for the interpretation of the various keypress timespan ranges. In an illustrative embodiment, "short press" and "long press" are defined as keycap selection and candidate selection, respectively. The method of the present invention permits depressing, for a certain timespan range each, one or more keys to form a desired character, followed by depressing, for another certain timespan range, one of the same keys to select a candidate character.

As the user selects character building blocks through depression of the keys on the keypad, a predictive engine of the present invention guides a user to a set of characters, one of which would most likely be the character that the user intended to construct. The disambiguating system of the present invention offers true language characters as candidates, eliminating confusing or nonsensical candidates. Whole phrases can be entered in just a few key presses.

After selecting a particular keycap, according to an illustrative embodiment of the method of the present invention, the user is presented with a list of candidates from which the user can choose. To choose that candidate, the user presses the numeric key that corresponds to the position of the candidate in the list and holds that key for a longer time than would be adequate for "normal" or "short" keypress. This action is called the "long press". At each "long press," a new set of candidates is displayed in the candidate selection monitor partition, based on the character chosen by "long press." At the same time, the user selection (either through "short" or "long" press) is displayed in the user selection monitor partition. The user can select a candidate via a long press or select a language building block by a short press of a numeric key. Although the illustrative embodiment details two keypress timespan ranges ("short press" and "long press"), the method can be adapted to encompass a variety of keypress timespan range definitions, while remaining within the scope of the present invention.

BRIEF DESCRIPTION OF THE DRAWINGS

The above and further advantages of the invention may be better understood by referring to the following description in conjunction with the accompanying drawings in which like reference numerals indicate identical or functionally similar elements:

FIGS. 1B and 1C are lists of Korean Hangul vowels and consonants, respectively, used to convey the written Korean language;

DETAILED DESCRIPTION OF AN ILLUSTRATIVE EMBODIMENT

For exemplary purposes, a description of the invention as implemented with the Korean character set is herein described. The invention, however, is not limited to the Korean character set, but may be readily adapted to be used with other character-based languages.

Figure 1A:
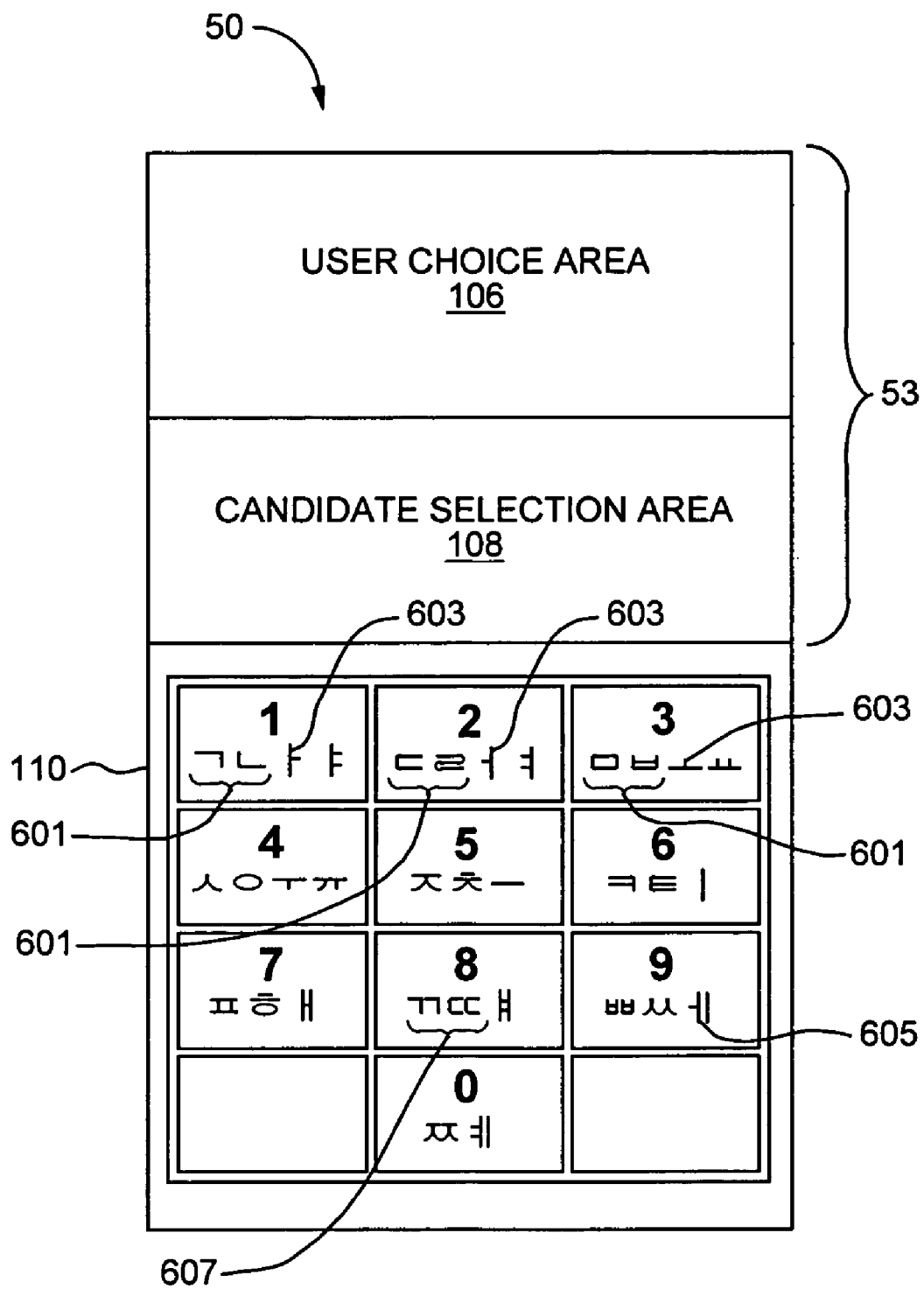
FIG. 1A is a front view of an illustrative embodiment of a Korean keypad of the invention.

To facilitate text entry in the Korean language, as an illustrative example of Asian language reduced keypad layout, jamos are associated with numeric keys of keypad 110 as in FIG. 1. Other arrangements of jamos or other character images may also be used. FIGS. 1A and 1B present the complete list of jamos that represents Korean Hangul. FIG. 1A presents vowels 500 that are grouped into monothongs 501 (marked by the letter "M") and diphthongs 502 (marked by the letter "D"). FIG. 1B presents consonants 510 that are grouped into consonants 512 (marked by the letter "C") and double consonants 514 (marked by the letter "$D_C$").

Combinations of these jamos, or character elements, can be placed in various orders, as desired, on the 10 user-actuable keys illustrated on exemplary reduced keypad 110 (FIG. 1). Various characteristics of the written Korean language can be used to intelligently place the jamos to reduce keystrokes, as described above. On the keypad of FIG. 1, keycaps 1-6 each display a mixture of consonants 601 and monothongs 603. Keys 7-9 and 0, for the most part, display diphthongs 605 and double consonants 607. Note that only 33 of all the possible jamos appear on the 10 keys; more or fewer could be displayed there, depending on the implementation, the number of which can be modified without changing the nature of the invention.

Korean text input system 50 further includes monitor display 53 which is divided into user choice area 106, which provides a display for the user to view previously-selected candidates and keypress selections, and candidate selection area 108, which provides a display of possible next Hangul characters from which the user may choose. In this illustrative embodiment, system 50 is a mobile telephone with text messaging capability. However, it should be appreciated that text entry predictive assistance described herein is similarly applicable to Asian language text entry in a number of other types of devices including, without limitation, personal digital assistants (PDAs) and other handheld computers, television set-top boxes, two-way pagers, automatic teller machines (ATMs), automobile navigation systems, video equipment, video editing equipment, portable digital audio players, game controllers, public information kiosks and the like.

Figure 2:
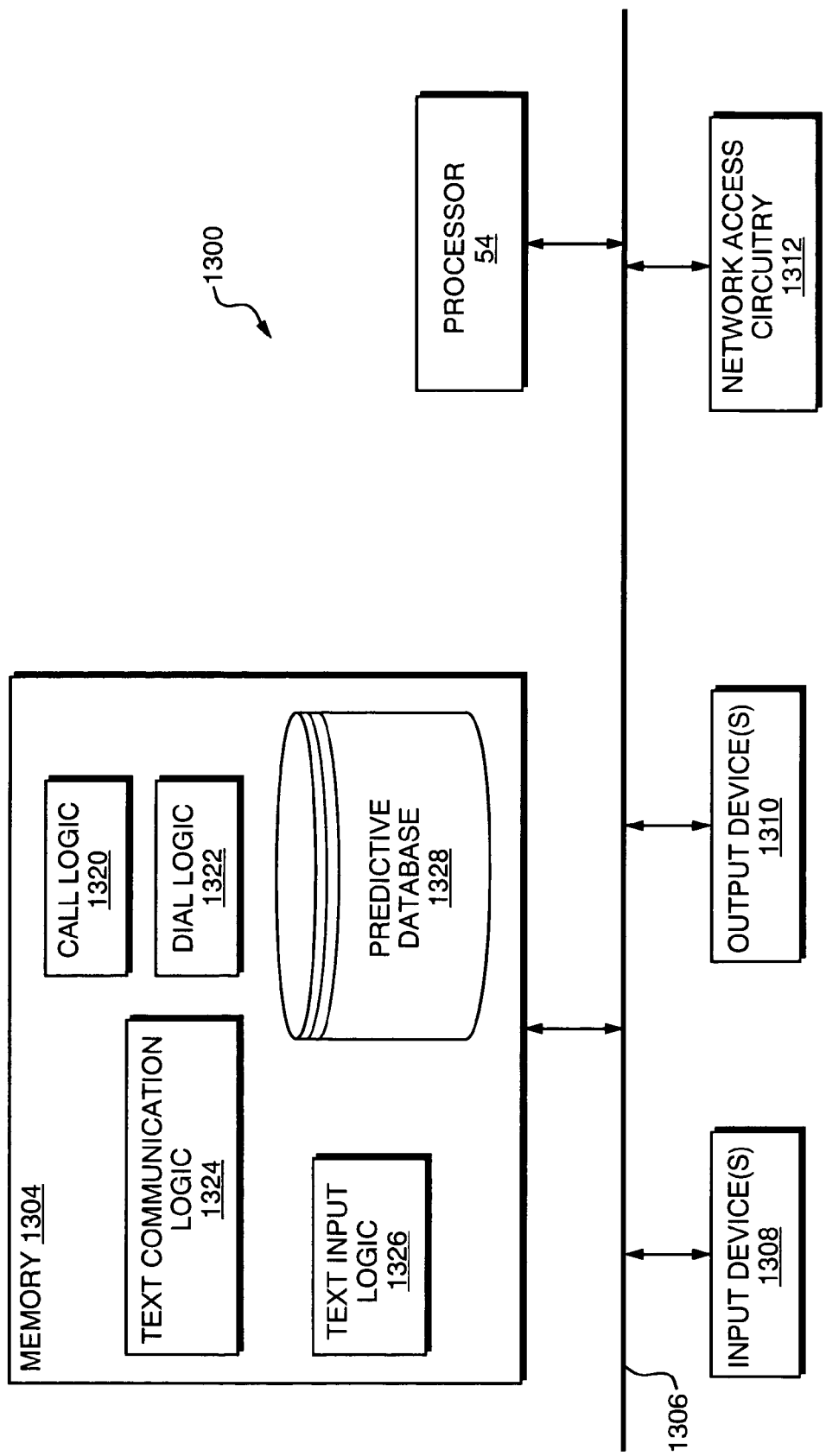
FIG. 2 is a schematic block diagram of hardware and software components employed in the system of the invention.

Device 1300, shown in FIG. 2, includes microprocessor 54, which retrieves data and/or instructions from memory 1304 and executes those instructions. Microprocessor 54 and memory 1304 are connected to one another through an interconnect 1306, a bus in this illustrative embodiment. Interconnect 1306 is also connected to one or more input devices 1308, and one or more output devices 1310, and network access circuitry 1312. Input devices 1308 include a typical mobile telephone keypad 110, as in FIG. 1. Output devices 1310 include a liquid crystal display (LCD) display 53, as in FIG. 3. Network access circuitry 1312 enables network communication with the mobile telephone.

Call logic 1320 is a collection of instructions and data that define the behavior of device 1300 in communicating through network access circuitry 1312. Dial logic 1322 is a collection of instructions and data that define the behavior of device 1300 in establishing communication through network access circuitry 1312. Text communication logic 1324 is a collection of instructions and data that define the behavior of device 1300 in sending and receiving text messages through network access circuitry 1312.

Text input logic 1326 is a collection of instructions and data that define the behavior of device 1300 in accepting textual data from a user. Such text entered by the user is interpreted by processor 54 which can accommodate many general-purpose uses. Predictive database 1328 stores data that is used to interpret text entered by the user as more fully described below.

Figure 3:
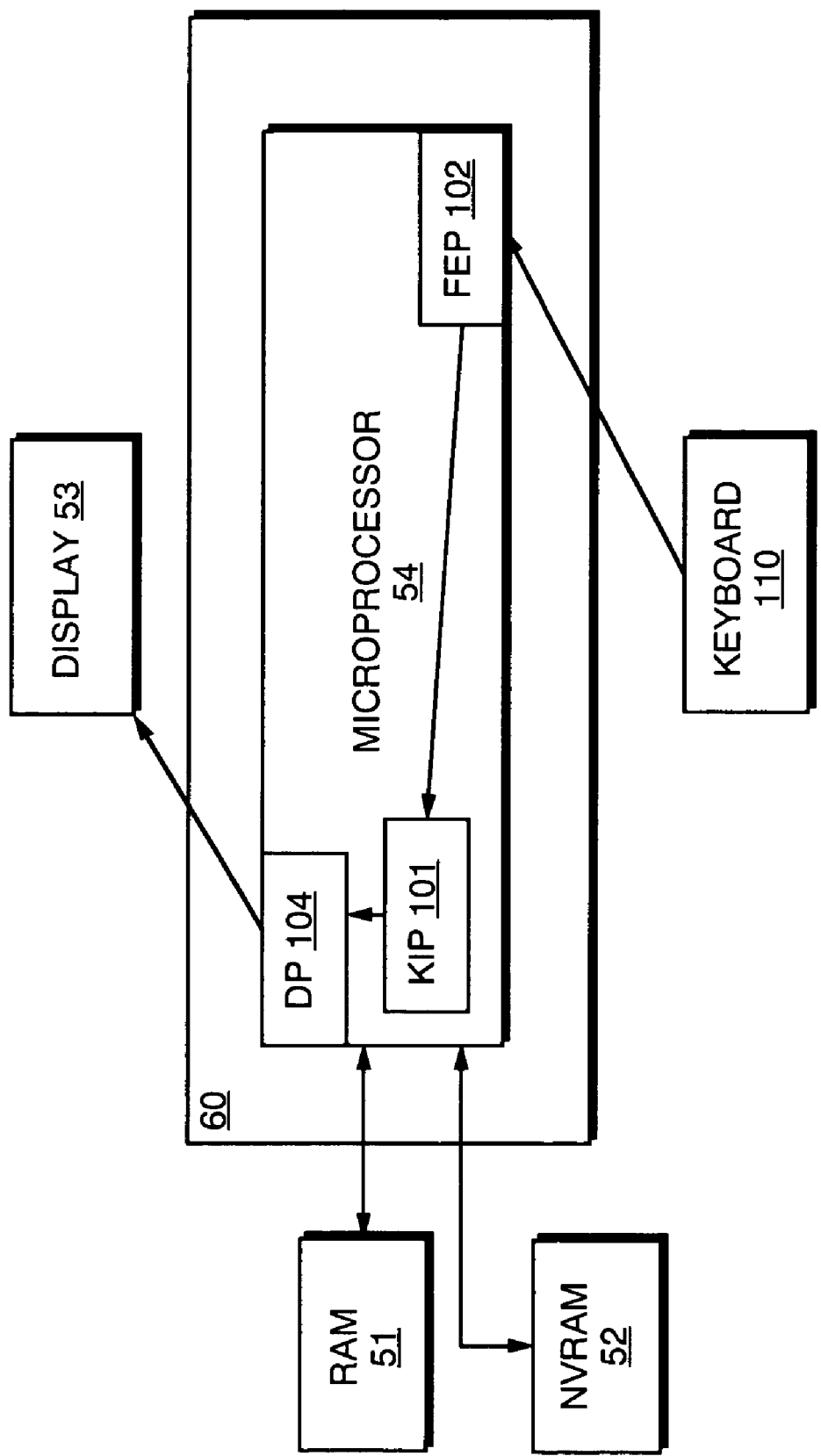
FIG. 3 is a schematic block diagram of an illustrative embodiment of the interaction between the keypad, the display and the processor as used in accordance with one embodiment of the invention.

FIG. 3 depicts an illustrative embodiment of the more general invention depicted in FIG. 2. In this embodiment, microprocessor 54 receives user input through keypad 110, and displays an output to the user through display 53. Microprocessor 54 uses Random Access Memory (RAM) 51 and non-volatile RAM (NVRAM) 52 for short- and long-term data and program storage, respectively. Sub-system 60, depicted in more detail in FIG. 4, provides display process (DP) 104, keypress interpretation process (KIP) 101, and front-end process (FEP) 102, which are the processing components of the system.

The method of the present invention requires an underlying system that supports multi-dimensional key definitions, thus reducing the need for special keys for certain functions and increasing the number of keys that can contain character elements, e.g. jamo. For example, depressing the "6" key can indicate to the KIP 101 any of the following: (1) consonant "$k^h$", (2) consonant "$t^h$", (3) vowel "i", or (4) candidate 6. The system relies on the length of time the user depresses the key, the "long press", to disambiguate between, for example, the selection of a candidate or the selection of a jamo, i.e. the difference between choosing a symbol and building a word. In an illustrative embodiment, the candidate selection timespan range is longer than the character element timespan range. Simultaneously, the system relies on a prediction code to disambiguate between, for example, the consonant "$k^h$" and the vowel "i".

Figure 4:
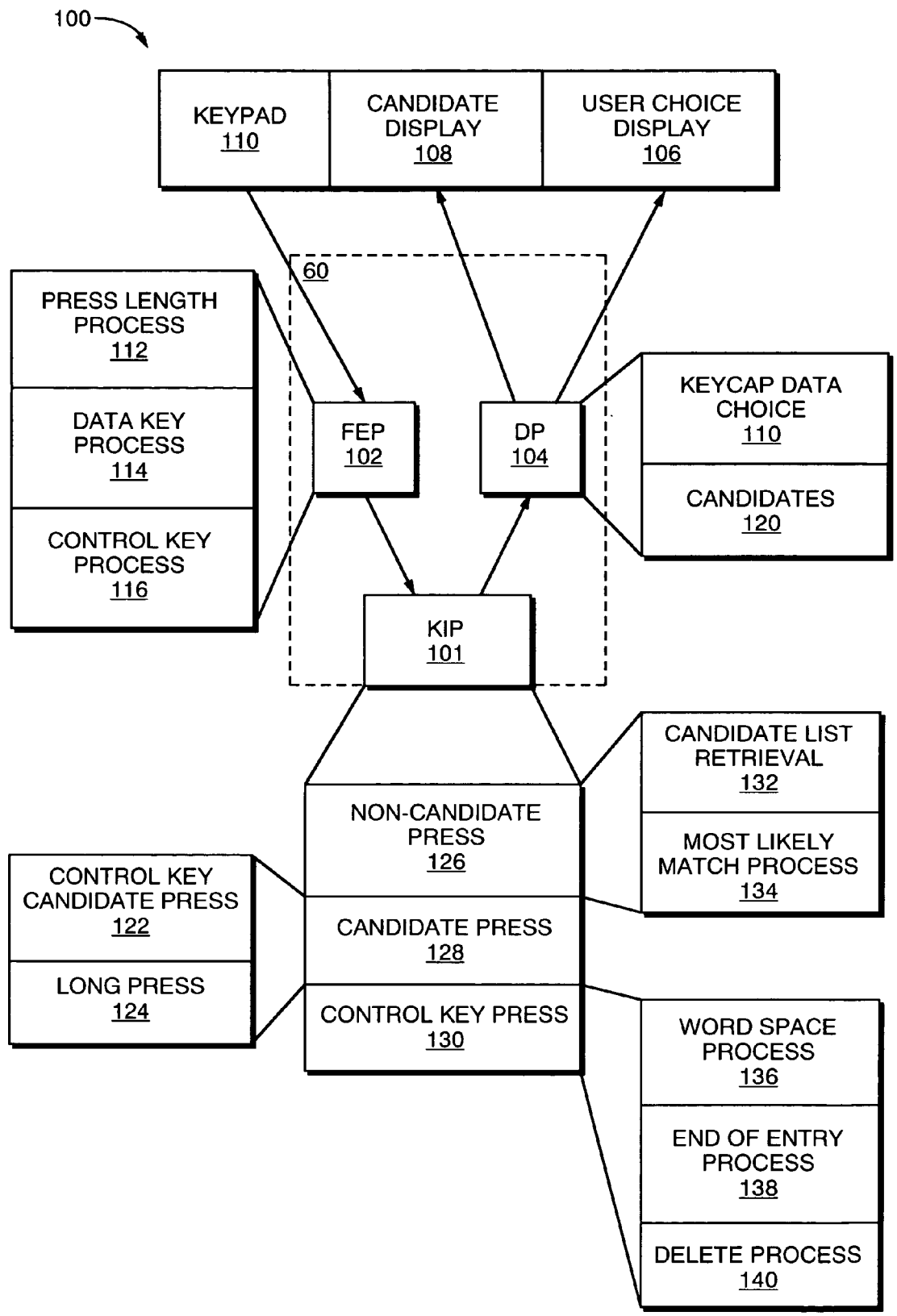
FIG. 4 is a schematic block diagram of an illustrative embodiment of the system of the invention including the keypad press functions.

In system 100, depicted in detail in FIG. 4, user interface is provided by a combination of user-defined input through keypad 110 and user-directed output through candidate display 108 and user choice display 106. KIP 101 interprets, or disambiguates, keystrokes entering KIP 101 through FEP 102. In turn, KIP 101 echoes user choices onto user choice display 106 and presents possible further choices to the user on candidate display 108. Between keystroke entry and user choice display, the subprocesses of KIP 101 work together to reduce the number of keystrokes required for the user to complete the Korean text entry.

More specifically, FEP 102 receives keypress signals from keypad 110. Press length process 112 times the length of the user's keypress in order to determine a keypress timespan. Data key process 114 determines which, if any numeric key was pressed, and control key process 116 determines which, if any, control key was pressed. FEP 102 passes the information gathered by these processes to KIP 101 for further processing.

At this point, KIP 101 determines which of its subprocesses to activate, depending on the FEP data it was passed. Non-candidate press process 126 is activated if the user pressed a numeric key for a "normal" length of time. Candidate list retrieval process 132 accesses a list of candidates (described below), depending on the user's input thus far, from RAM 51 or NVRAM 52. Most likely match process 134 marks one of the candidates as the most likely candidate based on frequency of use statistics. KIP 101 receives the list of possibilities for intended character strokes (i.e., candidates) from non-candidate press process 126, supplies the list, with the most likely match marked, to DP 104, which displays the candidate list on candidate display 108.

Alternatively, candidate press process 128 is activated if the user has selected, through either "long press" or control key candidate press process 122, one of the possible candidates displayed in candidate display area 108. Control key candidate press process 122 determines that the highlighted candidate is the selected candidate, prepares to display the selected candidate in the user choice display area 106, and prepares a new list of candidates based on that selection to be displayed in the candidate display area 108. Long press process 124 determines the candidate based on the numeric key that was depressed through long press, prepares to display that candidate in user choice area 106, and prepares a new list of candidates based on that selection to be displayed in candidate display area 108. As before, these data are returned to KIP 101, which passes them to DP 104, to be displayed on the appropriate portions of display 53.

Control key press process 130 is activated when a non-numeric key is depressed. Possibilities include, but are not limited to, "*", "#", "\", and "/". Any control keys can be defined, depending on the implementation and the particular keypad. In the illustrative embodiment, word space process 136 inserts a " " <space> between Hangul characters when a "*" is pressed. Delete process 140 deletes the most recent entry in user choice area 106 when a "\" is pressed. End of entry process 138 terminates further entry of text and begins processing entered text when "#" is pressed.

Figure 5:
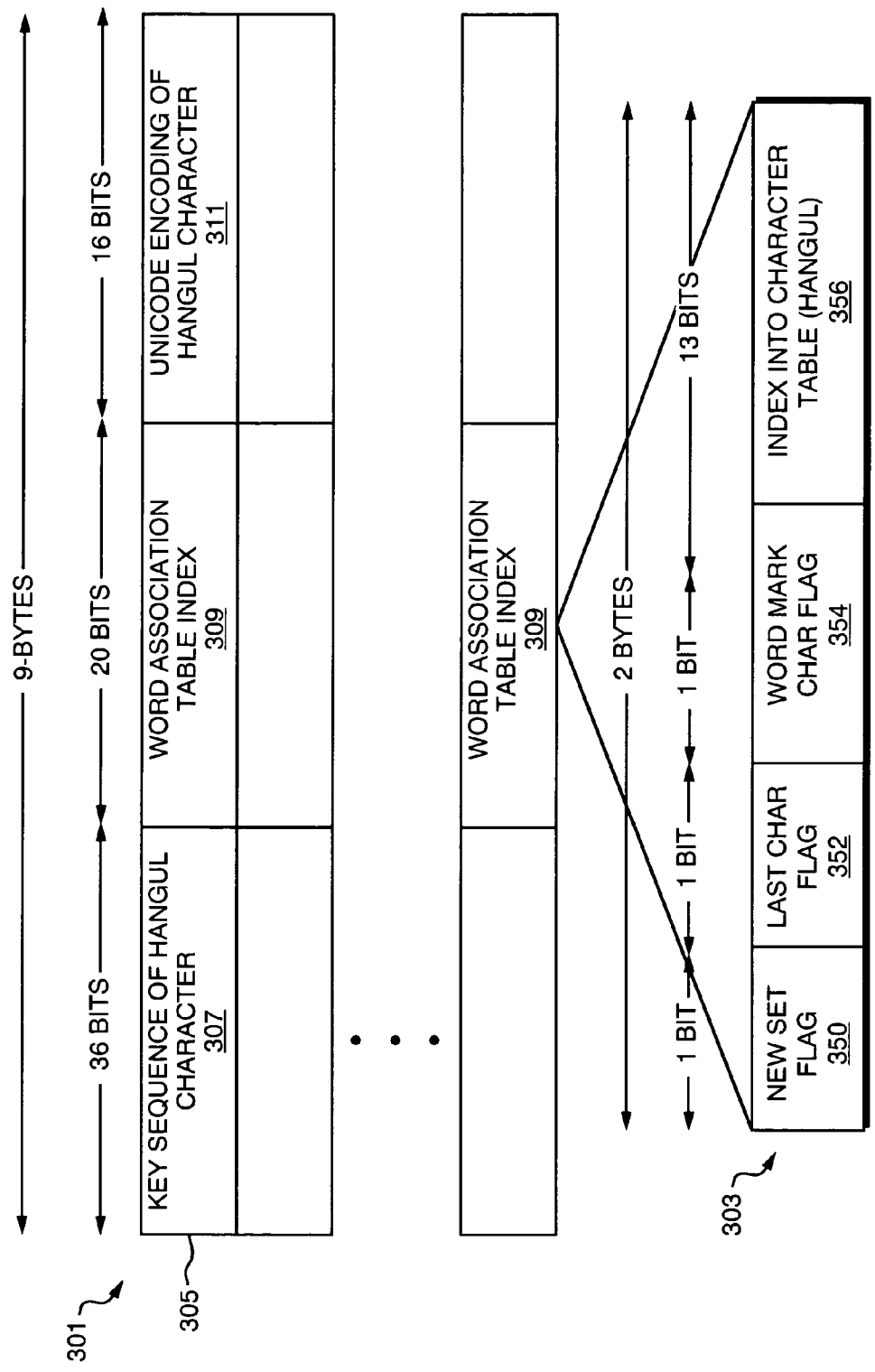
FIG. 5 is a schematic data flow and process diagram of an illustrative embodiment of the system of the invention.

FIG. 5 depicts the data structure layouts of a Hangul character table 301 which stores symbol information, and a word association table 303 which stores word information. Character table 301 stores individual Hangul characters in such a way as to make them useful for predicting successive characters according to user input. Each 9-byte record 305 in character table 301 includes key sequence information 307, word association index 309, and character Unicode value 311. Each of the 2350 Hangul characters (from the standard discussed above) has its specific key sequence stored in a record like record 305 in key sequence information 307. Rather than sort and store the Hangul character according to its jamo elements, the characters are sorted by key sequence wherein a given jamo is mapped to a particular key.

Word association table 303 includes 2-byte records, each of which includes new set flag 350, which signifies the beginning of a new set of word associations, last character flag 352, which indicates the last character in the word association record, word mark character flag 354, and character table index 356. Word association table 303 stores word records with the first character removed, since that character has already been located in character table 301 and is therefore known. All words in the word table start with the second character of the word, and, where possible, the amount of data that must be stored has been reduced by recognizing repeated characters in the data. Only the record pointed to from word association table 309 will have the new set flag 350 set, signifying the start of word records for an individual character. Last character flag 352 is set if the current record is the last record in the current chain. All records that constitute valid words will have word mark character flag 354.

Figure 6:
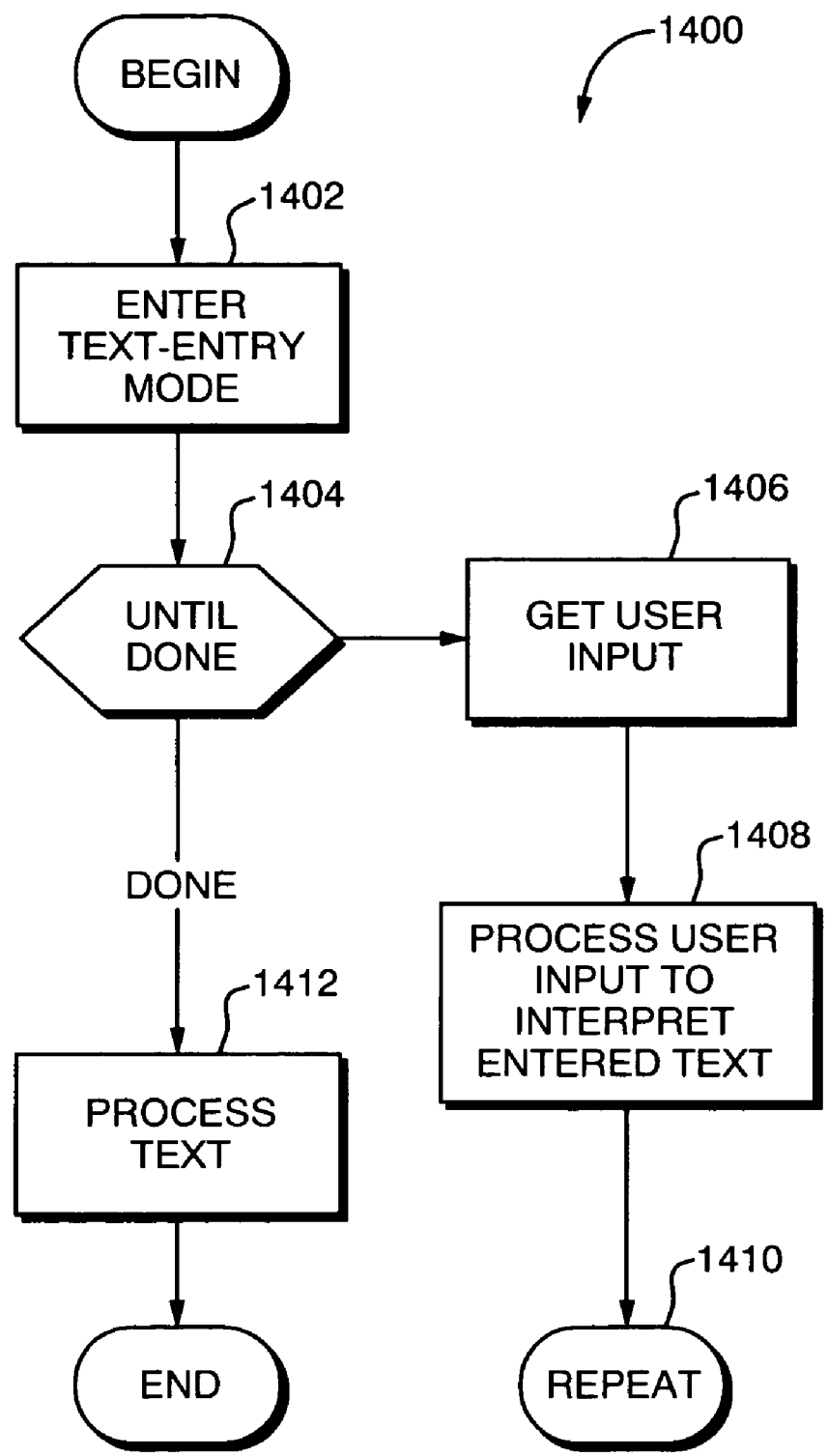
FIG. 6 is a flow chart of a procedure for an illustrative embodiment of the invention.

In operation, text input logic 1326 enters a text entry mode in which user input signals received from input devices 1308 are interpreted as text specified by the user. Loop step 1404 of the flow chart of FIG. 6, and repeat step 1410, define a loop in which text is entered by the user according to steps 1406-1408 until the user indicates that the message is complete. For each user input signal, processing transfers to step 1406. In step 1406, text input logic 1326 receives a user-generated signal from input devices 1308. Processing transfers to step 1408 in which text input logic 1326 interprets the user-generated signal to interpret the text entered by the user. The interpretation step 1408 is discussed in greater detail with reference to FIG. 7.

Signals generated by the user continue to be received and interpreted by text input logic 1326 in repeated performances of steps 1406-1408 until the user indicates that no more text is to be entered. In step 1412, text input logic 1326 processes text entered by the user, e.g. by sending the text to text communications logic 1324 to send the entered text to an intended recipient.

Figure 7:
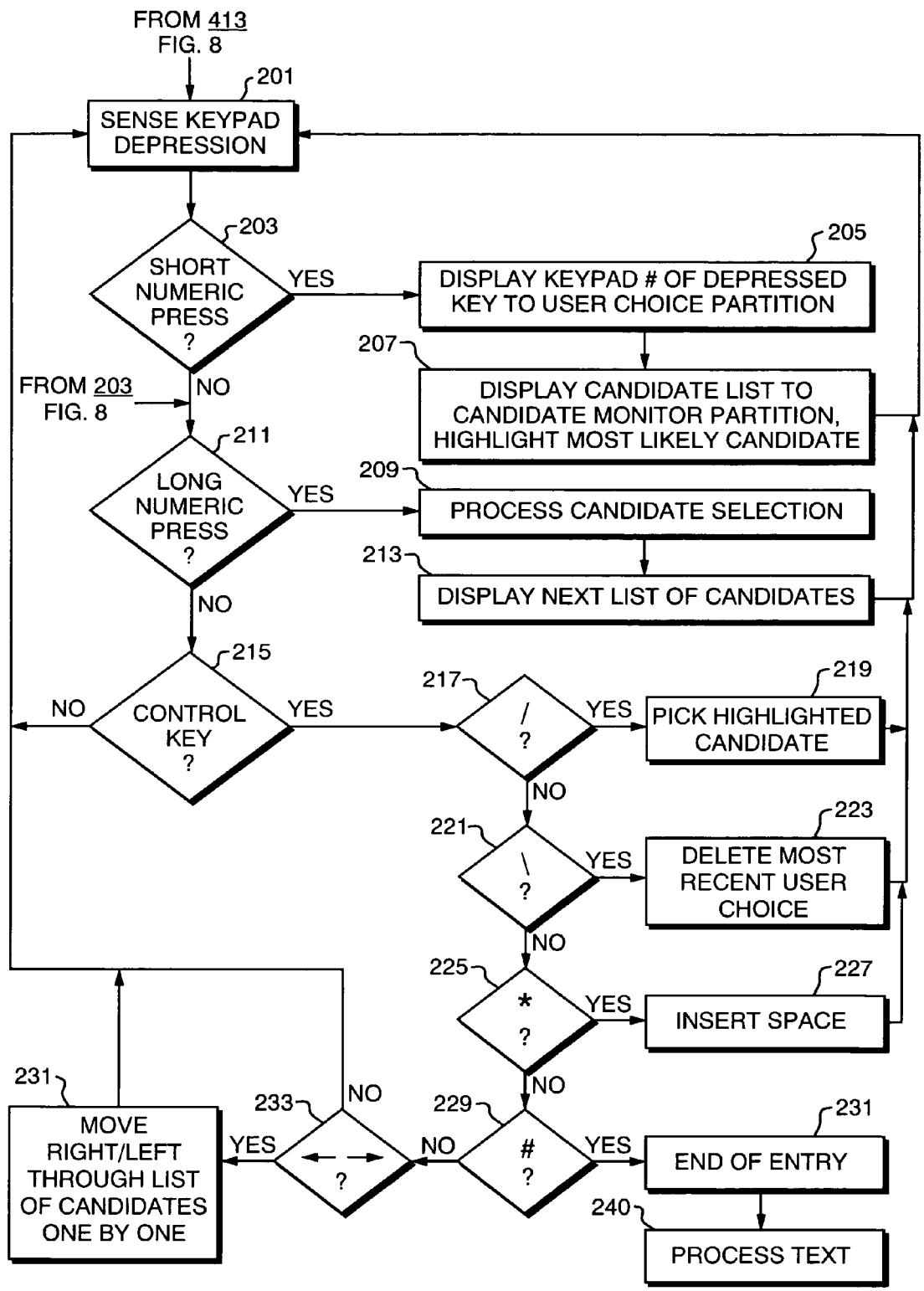
FIG. 7 is a detailed flow chart of text entry and text processing procedures according to a method of the illustrative embodiment.

More specifically, as depicted in further detail in FIG. 7, when a user presses a key (step 201), a possible jamo is selected, a candidate selection is made, or a control key is pressed. If a jamo is selected, i.e., if there is a "short" press of one of numeric keys 0-9 (decision step 203), the numeral of the depressed key is displayed (step 205) in user choice area 106, and a list of candidates derived from character table 301 (FIG. 5) and word table 303 is displayed in area 108, with the most likely candidate highlighted (step 207). The list is generated from predictive code that identifies relationships between character elements and numeric keys, and produces a list of predictive choices based upon the probability of use of a particular character element. System 100 returns to capture more possible keypad entries (step 201).

If there is a "long" press of a numeric key (decision step 211), a candidate has been chosen and must be displayed in area 108 (step 209), and a new set of candidates must be determined from tables 301 and 303 (step 213). These tables include data generated by a predictive code that identifies relationships between character elements and work candidates, and produces a list of predictive choices based upon the probability that a particular candidate is intended when a particular character element is selected. Again system 100 returns to gather more user keypad entries (step 201).

Alternately if a control key is pressed (decision step 215), processing depends on which control key was pressed, and depends on the particular keypad and definitions. In the illustrative embodiment, if a "/" is depressed (decision step 217), the highlighted candidate is chosen and processed as above (step 219). If a "\" is depressed (decision step 221), the most recent user choice is deleted as above (step 223). If a "*" is depressed, (decision step 225), a space is inserted in the entered text (step 227). If a "#" is depressed, text entry is terminated (step 231), and entered text is processed (step 240). If a right-facing arrow is depressed, the cursor is moved to the right from one candidate to the next, the candidate upon which the cursor rests being highlighted (step 231). Similarly, if a left-facing arrow is depressed, the cursor is moved to the left. System 100 returns after each of the foregoing control key presses (except the text termination entry), to receive more possible user input.

Figure 8:
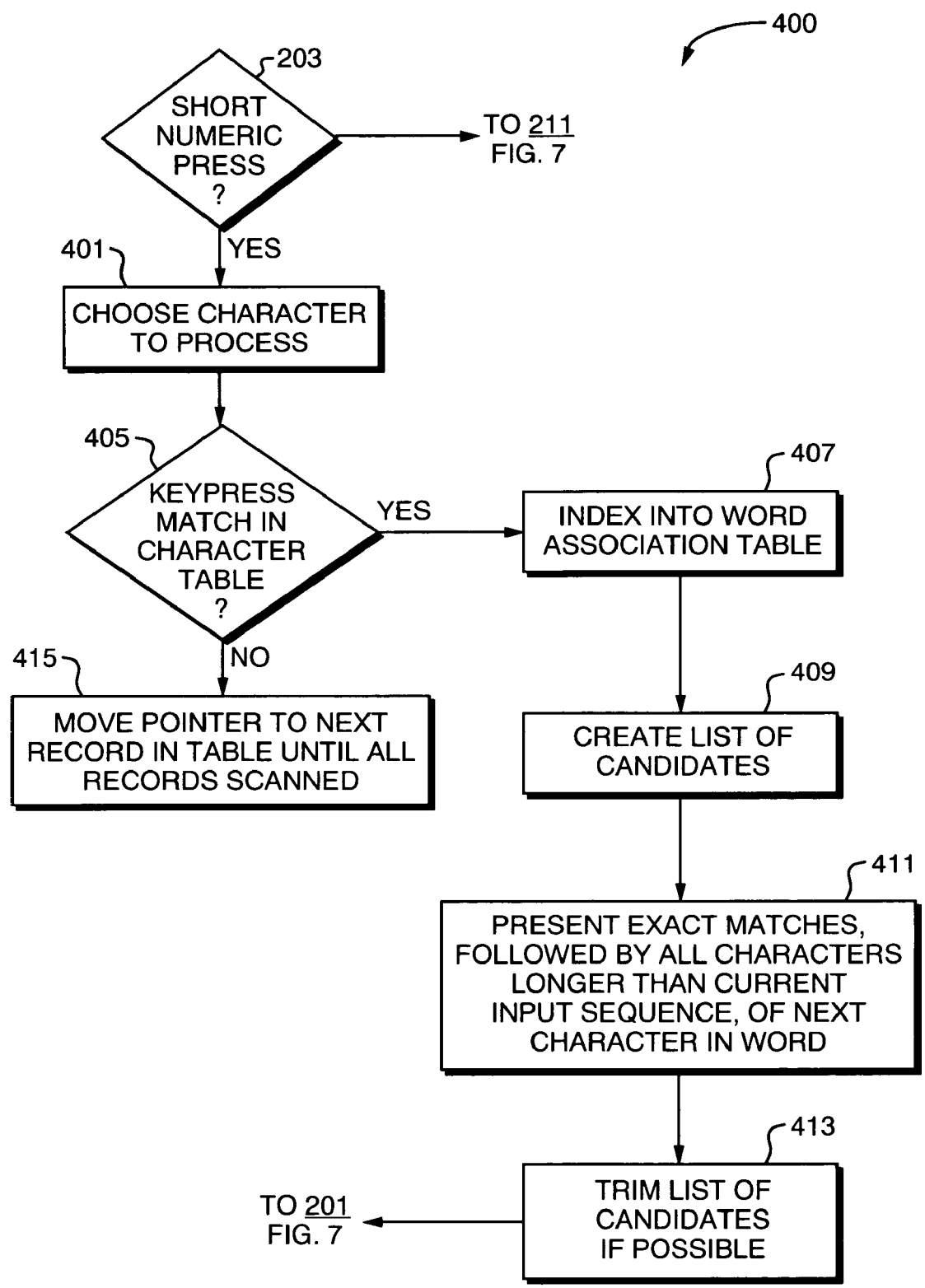
FIG. 8 is a detailed flow chart of the long press feature of an illustrative embodiment of the invention.
Figure 9A:
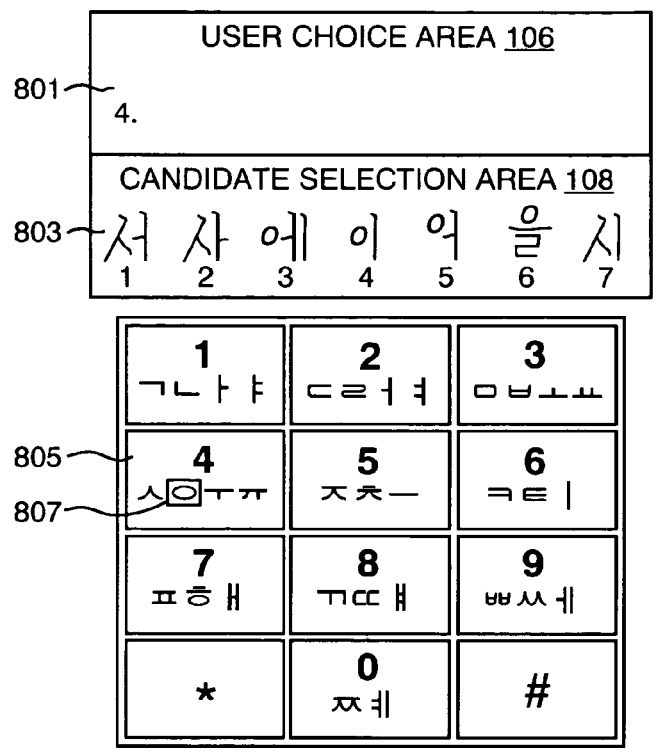
FIGS. 9A, 9B, 9C and 9D are progressive keypad views of an illustrative example of the keypress function of the present invention.
Figure 9B:
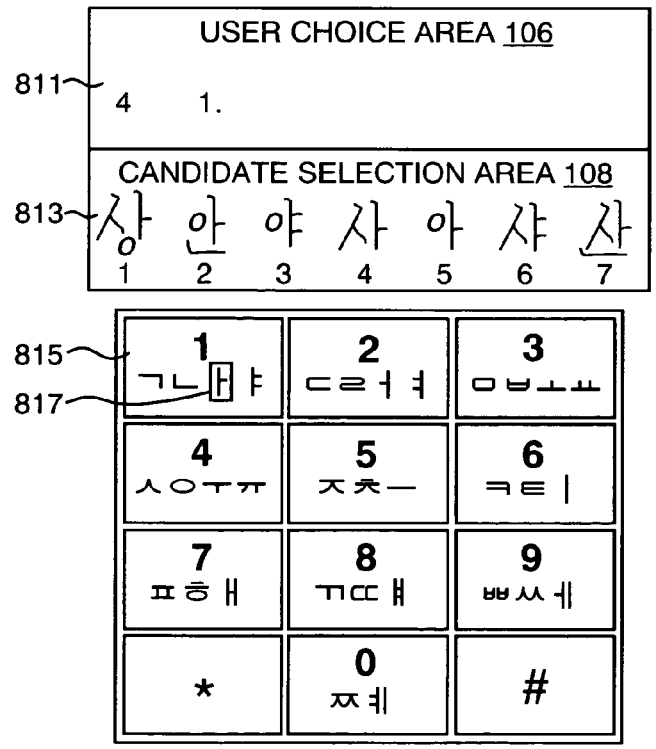
Figure 9C:
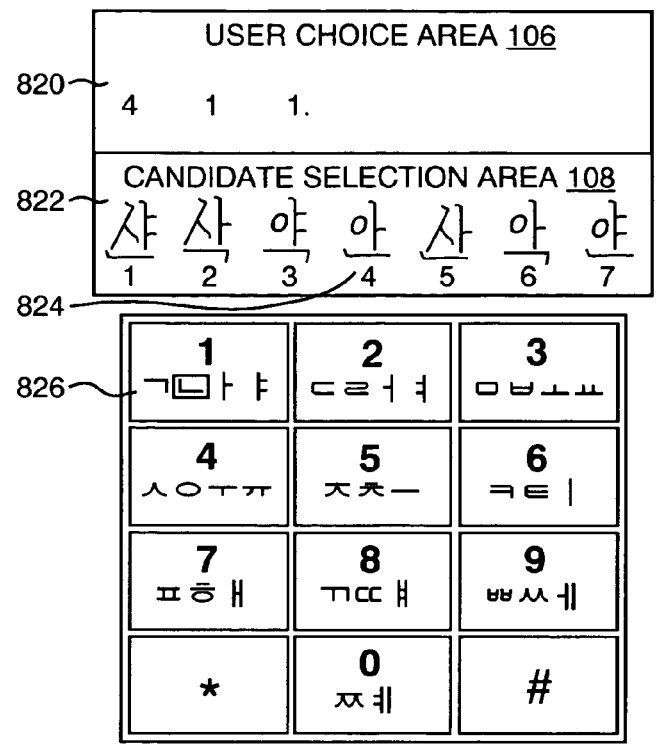
Figure 9D:
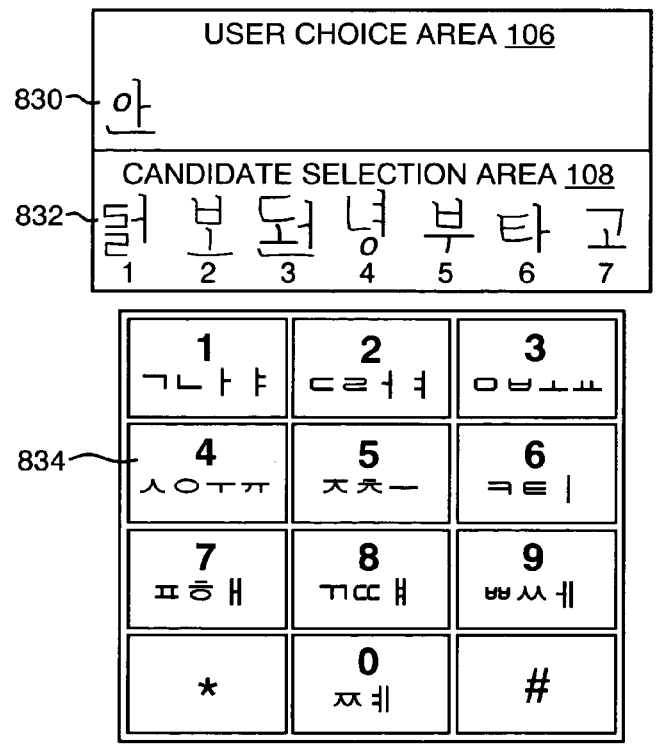

Referring now to FIG. 8, a short press of a numeric key requires system 100 to choose one of the jamo on the keycap to process (step 401), and then to look for a match on that jamo in table 301 (decision step 405).

Table 301 is looped through until a match (step 415) is found. The matching record is retrieved, from which is retrieved the index into table 303 (step 407), which serves to create a list of appropriate candidates for the jamo entered (step 409). The candidate list is constructed of exact matches from table 303 along with all characters that can be formed that are longer than the current input sequence of jamos (step 411). The list of candidates is trimmed down through statistical methods, if possible (step 413), and control is returned to gather more user input (step 201).

As an example of use of the system, we refer now to FIGS. 9A-9D, which illustrate the keystrokes needed to input Hangul character 830. (FIG. 9D) Specifically, the user enters, via a "short" press of numeric keys 4, 1, and 1, each press of which has the effect of both selecting a keycap jamo and presenting a list of new candidates. First, the user presses the numeric key 4 (805) to select jamo 807 which results in a display of the number "4" 801 and a display of candidates 803, of which the center character is highlighted because it is the most likely character.

Now that the user has the first portion of the intended character, the user now added the next aspect by pressing numeric key 1 (815) to select jamo 817, which results in display 811 and candidates 813, again with the center candidate highlighted. After making that choice, the user presses key 1 (826) again and thus adds "1" to display 820 and presents list of candidates 822, with candidate 824, the desired character, highlighted. To select the desired character 824 from the list of candidates, numeric key "4" (834) is pressed and held. The result is that candidate 824 is displayed in user choice area 106 as character 830, and previous jamo selection numerics are erased. A new list of candidates 832 is displayed with the center candidate highlighted.

In the system of the illustrative embodiment, the most frequently used syllable or word is placed in the default position on the candidate display, i.e. where the cursor is resting, so that it can be chosen most easily. Other candidates are accessed by spacing left or right through the candidate list before making the selection, or by simply making a long press of the numeric key that corresponds to the candidate. After a syllable is selected, one or more common next syllables are offered as are more frequently used words starting with the selected syllable or syllables. In the illustrative embodiment, the user can also choose to ignore subsets of a syllable or of a word, including complete syllables, and focus only on the complete words offered by the predictive feature. The user can also choose to wait to make any choices until the entire word is complete.

The foregoing has been a detailed description of illustrative embodiments of the invention. Various modifications and additions can be made without departing from the spirit and scope of the invention. For example, the particular character elements and their positioning on the keypad can vary. The number of keypress timespan ranges, and the length of time each represents is completely implementation-dependent. While a particular keypad system is described, it is expressly contemplated that any keypad and interpretation system capable of inputting and disambiguating variable-length keypress may be substituted. Further, the use of the KS X 1001:1992 standard character set, and Johab and Unicode encoding in the description herein are exemplary only, other standard character sets and encodings can implement the invention. Finally, it is expressly contemplated that any or all of the architecture, processes and data structures described above can be implemented in hardware, firmware or software comprising a computer-readable medium consisting of program instructions executing on a computer, or any combination of hardware, firmware and/or software. Accordingly, this description is meant to be taken only by way of example, and not to otherwise limit the scope of this invention.

What is claimed is:

1. A text input system comprising:
   a user input device having a plurality of user-actuable keys, each said key displaying one or more Asian character elements for selection by a user, each said key being associated with at least one character element of an Asian language character and each said key also being associated with a suggested candidate, character or word, each said key also being actuable for a variable timespan range for building an Asian character or word from said Asian character elements; and
   a keypress interpretation process for determining the duration of the variable timespan range and comparing said duration to a plurality of timespan ranges, at least one of which represents a character element selection by a user, another of which represents a candidate selection by said user, and said keypress interpretation process displaying, in response to selections by said user, further suggested candidates allowing the user to build an Asian character or word from one or more of its Asian character elements.

2. The system of claim 1 wherein said candidate selection timespan range is longer than said character element selection timespan range.

3. The system of claim 1 further comprising a user output device for echoing an output from said keypress interpretation process.

4. The system of claim 3 wherein said user output device is an electronic display, said electronic display having at least a user choice display area and a candidate display area.

5. The system of claim 1 wherein said user input device further comprises numeric keys and control keys, said numeric keys enabling character element selection and candidate selection, said control keys enabling functions, said functions including spacing, deletion, and candidate selection.

6. The system of claim 1 wherein said user input device further comprises a keypad having at least ten numeric keys and at least two control keys, said numeric keys being assigned to one or more character elements.

7. The system of claim 6 further comprising a memory, said memory storing one or more relationships between said character elements and said numeric keys, said memory storing one or more relationships between said character elements and said candidates.

8. The text input system as defined in claim 1 wherein said Asian character elements are Korean Hangul jamos including at least one of a consonant, a vowel and a candidate or word.

9. A wireless telephone system for text input comprising:
   a user input device having a plurality of user-actuable keys, each said key displaying one or more Asian character elements for selection by a user, each said key being associated with at least one character element of an Asian language character, and each said key also being associated with a suggested candidate, each said key also being actuable for a variable timespan range for building an Asian character or word from said Asian character elements; and
   a keypress interpretation process for determining the duration of the variable timespan range and comparing said duration to a plurality of timespan ranges, at least one of which represents a character element selection by a user, another of which represents a candidate selection, and said keypress interpretation process displaying, in response to selections by said user, further suggested candidates allowing the user to build an Asian character or word from one or more of its Asian character elements.

10. The system of claim 8 further comprising a user output device for echoing an output from said keypress interpretation processor.

11. The system of claim 10 wherein said user output device is an electronic display, said electronic display having at least a user choice display area and a candidate display area.

12. The system of claim 8 wherein said user input device further comprises numeric keys and control keys, said numeric keys enabling character element selection and candidate selection, said control keys enabling functions, said functions including spacing, deletion, and candidate selection.

13. The system of claim 8 wherein said user input device further comprises a keypad having at least ten numeric keys and at least two control keys, said numeric keys being assigned to one or more character elements.

14. The system of claim 13 further comprising a memory, said memory storing one or more relationships between said character elements and said numeric keys, said memory storing one or more relationships between said character elements and said candidates.

15. The system of claim 9 wherein said candidate selection timespan range is longer than said character element selection timespan range.

16. A method for processing electronic entry of text comprising:
   receiving user input into a front end process, said front end process interfacing with a user input device, said user input device having at least one user-actuable key, said key being actuable for a variable timespan range, and each key being associated with at least one Asian character element;
   determining the duration of the variable timespan range;
   comparing said duration to a plurality of minimum timespan ranges, at least one of which represents a character element selection, another of which represents a candidate character or word selection; and
   displaying, in response to selections by said user, further suggested candidates allowing the user to build an Asian character or word from one or more of its Asian character elements.

17. The method of claim 16 including the further step of displaying said user input on a user output device, said user output device being an electronic display, said electronic display having at least a user choice display area and a candidate display area.

18. The method of claim 16 wherein said user input device further comprises numeric keys and control keys, said numeric keys enabling character element selection and candidate selection, said control keys enabling functions, said function including spacing, deletion, and candidate selection.

19. The method of claim 16 wherein said user input device further comprises a keypad having at least ten numeric keys and at least two control keys, said numeric keys being assigned to one or more character elements.

20. The method of claim 19 further comprising
   storing one or more relationships between said character elements and said numeric keys in a memory; and
   storing one or more relationships between said character elements and said candidate in said memory.

21. The method as defined in claim 20 including the further step of storing as said relationship between said character elements and said numeric keys, a list of predictive choices based upon the probability of use of a particular character element.

22. The method as defined in claim 20 including the further step of storing as said relationship between said character element and said candidates, a list of predictive choices based upon the probability that a particular candidate is intended when a particular character element is selected.

23. The computer readable medium comprising electronic instructions for carrying out the method of claim 16.

24. The method of claim 16 wherein said candidate selection timespan range is longer than said character element selection timespan range.

* * * * *